United States Patent
Levandoski et al.

(10) Patent No.: US 9,493,682 B2
(45) Date of Patent: Nov. 15, 2016

(54) ELECTRICALLY CONDUCTIVE STRUCTURAL ADHESIVE

(71) Applicants: Susan L. Levandoski, Bristol, CT (US); Timothy P. Walsh, Weymouth, MA (US); Sam Bail, San Francisco, CA (US)

(72) Inventors: Susan L. Levandoski, Bristol, CT (US); Timothy P. Walsh, Weymouth, MA (US); Sam Bail, San Francisco, CA (US)

(73) Assignee: Henkel IP & Holding GmbH, Duesseldorf (DE)

(*) Notice: Subject to any disclaimer, the term of this patent is extended or adjusted under 35 U.S.C. 154(b) by 88 days.

(21) Appl. No.: 14/170,829

(22) Filed: Feb. 3, 2014

(65) Prior Publication Data

US 2014/0220243 A1 Aug. 7, 2014

Related U.S. Application Data

(63) Continuation of application No. PCT/US2012/042590, filed on Jun. 15, 2012.

(60) Provisional application No. 61/514,724, filed on Aug. 3, 2011.

(51) Int. Cl.
*C09J 9/02* (2006.01)
*C09J 133/08* (2006.01)
*C09J 11/04* (2006.01)
*C08K 3/04* (2006.01)

(52) U.S. Cl.
CPC . *C09J 9/02* (2013.01); *C09J 11/04* (2013.01); *C09J 133/08* (2013.01); *C08K 3/04* (2013.01); *C08L 2203/20* (2013.01)

(58) Field of Classification Search
CPC .......... C09J 9/02; C09J 11/04; C09J 133/08; C08K 3/04; C08L 2203/20
USPC ......................................................... 252/500
See application file for complete search history.

(56) References Cited

U.S. PATENT DOCUMENTS

| | | | |
|---|---|---|---|
| 4,258,123 A | 3/1981 | Nagashima et al. | |
| 4,505,793 A | 3/1985 | Tamoto et al. | |
| 4,574,142 A | 3/1986 | Charnock | |
| 4,777,205 A * | 10/1988 | La Scola | C08K 3/04 252/503 |
| 5,512,608 A | 4/1996 | Bachmann et al. | |
| 6,274,688 B1 | 8/2001 | Nakagawa et al. | |
| 2004/0077766 A1 | 4/2004 | Cooman et al. | |
| 2010/0101724 A1* | 4/2010 | Schuft | C09J 4/06 156/325 |
| 2010/0331462 A1* | 12/2010 | Levandoski | C09J 4/06 524/130 |
| 2011/0002876 A1 | 1/2011 | Konradi et al. | |

FOREIGN PATENT DOCUMENTS

| | | |
|---|---|---|
| JP | 5929119 B2 | 7/1984 |
| JP | 2011231209 A | 11/2011 |
| WO | 2005087850 A1 | 9/2005 |
| WO | 2009009009 A2 | 1/2009 |

OTHER PUBLICATIONS

International Search Report for PCT/US2012/042590, 2 pages.

* cited by examiner

*Primary Examiner* — Mark Kopec
*Assistant Examiner* — Danny N Kang
(74) *Attorney, Agent, or Firm* — Steven C. Bauman

(57) ABSTRACT

The present invention relates to curable compositions which are capable of safely and sufficiently bonding components of electrical devices. In particular, the invention relates to electrically conductive, curable compositions, which are capable of rapidly curing at room temperatures as well as at elevated temperatures.

12 Claims, No Drawings

ELECTRICALLY CONDUCTIVE STRUCTURAL ADHESIVE

FIELD OF THE INVENTION

The present invention relates to curable adhesive compositions. More particularly, the invention relates to two-part adhesive compositions including electrically conductive components, and which are curable with heat or at ambient temperatures, for example at room temperature.

BRIEF DESCRIPTION OF RELATED TECHNOLOGY

Curable adhesive compositions have been used in a variety of applications, including bonding of components in various hand-held electronic devices. A high degree of strength and adhesiveness is required for such devices, which are oftentimes dropped and treated with a low level of care by their users. However, it has traditionally been difficult to achieve a composition that has a suitable electrical conductivity to be used in such electronic devices. Further, it has been difficult to achieve an adhesive composition that not only provides the right amount of electrical conductivity, but also still maintains the adhesiveness and structural integrity required for such devices.

It is thus desired to provide a rapid curing, electrically conductive composition, which may include halogen-free components, and which is suitable for use in various electronics. It is further desired to provide a composition that is capable of rapidly curing in the presence of heat and/or at room temperature.

SUMMARY OF THE INVENTION

1. One aspect of the present invention provides two-part curable composition comprising:
   a. A first part comprising:
      i. at least one (meth)acrylate monomer;
      ii. an electrically conductive component;
      iii. an acid catalyst;
      iv. a free radical initiator; and
      v. a free radical stabilizer; and
   b. a second part comprising:
      i. at least one (meth)acrylate monomer;
      ii. a catalyst; and
      iii. a stabilizer for stabilizing said catalyst;
   wherein said first part and said second part are combined together to form a curable composition.

DETAILED DESCRIPTION OF THE INVENTION

The inventive compositions of the present invention are useful in a variety of end-use applications including adhesive, sealant, coating and potting applications, and art particularly useful in the electronic, automotive and other material-sensitive applications. The present compositions are particularly suitable for electronic devices, in which an electrically conductive composition would be quite useful. For instance, the present compositions are useful for bonding casings and internal components of various personal and/or portable electronics, such as laptop computers, personal music players, GPS devices, PDA's, video display devices (such as televisions and other video players) and other similar products. The inventive adhesive compositions may of course be useful for other, larger electronic products, as well, such as televisions, desktop computers, and the like. An adhesive composition used in personal electronic devices, especially portable devices, should have a high impact strength so as to maintain adhesion and strength if the device is accidentally dropped by the user. The low glass transition temperatures of the inventive compositions allow the product to be used for low temperature applications and still maintain integrity.

As used herein, the terms "cure" and "curing" refer to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing.

As used herein, the terms "halo" and "halogen" are intended to be synonymous, and both are intended to include elements commonly classified as "halogens", such as chlorine, fluorine, bromine, and iodine. The term "halogen-free" refers to a composition or component that is substantially free of any halogens, such as at least 99% free of halogens. Most desirably, a "halogen-free" component is completely free of any halogens.

The present invention is a two-part curable composition. The curable composition of the present invention is desirably rapidly curable at room temperature, i.e., about 20° C. to about 25° C. without the need for applied heat. Thus, at room temperatures, the two-part composition is capable of curing in about 24 hours, more desirably in about 8 to about 16 hours, and most desirably in about 8 to about 12 hours. At elevated temperatures, the two-part composition of the present invention may cure at an even faster rate (referred to herein as an "ultra fast" cure). At temperatures of about 100-150° C., ultra fast compositions described herein are capable of curing in about 5 minutes to about 20 minutes, and most desirably in about 10 minutes to about 15 minutes.

Curable compositions may include a one-part curable composition or a multi-part curable composition, wherein the various parts are combined together to form the curable composition. The inventive composition described herein desirably is a two-part curable composition, the two parts including a first part and a second part. The first and second parts may be separately stored until curing of the composition is desired. As such, each of the first and second parts should not prematurely cure prior to mixing the two components together, which will be discussed in further detail below. In use, the first and second parts are mixed together and applied to the desired surface or surfaces to which bonding is desired. As explained above, the composition may then cure at a fast rate (or ultra fast rate if heat is applied).

The first part desirably includes at least one (meth)acrylate. As used herein, the term "(meth)acrylate" includes both acrylates and methacrylate monomers. The first part may include any desired (meth)acrylate monomers including, without limitation, such monomers as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adduct, etc. Particularly desirable is a combination of mono-, di- and tri-functional monomers, such as isobornyl acrylate, 1,3-butylene glycol dimethacrylate and tri-methyl propanol trimathacrylate. However, any (meth)acrylate or (meth)acrylates may be used in the present invention.

The first part may include any combination of acrylate monomers, including (meth)acrylate monomers, monofunctional acrylate monomers, di-functional acrylate monomers, tri-functional acrylate monomers, and combinations thereof. The (meth)acrylate monomer may be present in the first part in amounts of from about 30% to about 80% by weight of the first part. More desirably, the (meth)acrylate monomer may be present in the first part in amounts of from about 30% to about 50% by weight of the first part. In some embodiments, the first part further includes a second acrylate monomer, selected from the group consisting of monofunctional acrylate monomers, di-functional acrylate monomers, tri-functional acrylate monomers, and combinations thereof. When the second acrylate monomer is used, it may be present in an amount of from about 5% to about 40% by weight of the first part.

In one embodiment, the (meth)acrylate may have the general structural formula I.

$$H_2C=CGCO_2R^2 \qquad (I)$$

where G may be hydrogen or alkyl of 1 to about 4 carbon atoms, and $R^2$ may be selected from alkyl, cycloalkyl, alkenyl, cycloalkenyl, alkenyl, aralkyl or aryl groups 6 to about 16 carbon atoms, any of which may be optionally substituted or interrupted as the case may be with oxygen, carbonyl, hydroxyl, ester, carboxylic acid, urea, urethane, carbonate amine, amide, sulfur, sulfone and the like.

In another embodiment, the (meth)acrylate may have general structural formula II:

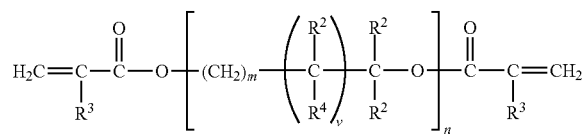

(II)

where $R^2$ may be selected from hydrogen, alkyl of 1 to about 4 carbon atoms, hydroxyalkyl of 1 to about 4 carbon atoms or

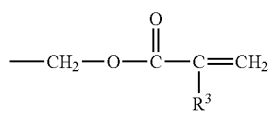

where $R^3$ may be selected from hydrogen and alkyl of 1 to about 4 carbon atoms; $R^4$ may be selected from hydrogen, hydroxy and

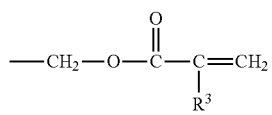

where m is an integer equal to at least 1, e.g., from 1 to about 8 or higher, for instance, from 1 to about 4; n is an integer equal to at least 1, e.g., 1 to about 20 or more; and v is 0 or 1.

The first part may include an electrically conductive filler component, such as a metal or other component. In particular, the electrically conductive component may include, for example, fillers such as carbon black, graphite, metallic components, such as aluminum, copper, brass, bronze, nickel or iron, conductive pigments, such as tin oxide, iron oxide, and titanium dioxide, organic or inorganic salts, and combinations thereof. Of particular use is graphite, and particularly synthetic graphite, including, for example, those products sold under the trade names Graphite 3775 and Micro 450, sold by Asbury Carbons. The electrically conductive component may include synthetic graphite, natural graphite, and combinations thereof.

It is particularly desirable, however, that the electrically conductive material be suitable for use in the first part. That is, depending upon the particular components of the first part, the electrically conductive material should not be a material that will prematurely cure the composition or otherwise affect the first part prior to mixing the first and second parts together. In embodiments where the first part includes a methacrylate and an initiator, it may be desired that the electrically conductive material be void of any materials that may potentially act as a catalyst to the other components of the first part. For example, it may be desired that the electrically conductive component lack copper or iron. Certain materials, although often marketed as "pure", may undesirably include traces of materials that may potentially act as a catalyst. For example, "pure" graphite may include traces of other, more undesirable metals. Thus, if a graphite composition is used as the electrically conductive component, it is desirable that synthetic graphite having a high degree of purity be used.

The electrically conductive component desirably has a particle size of from about 5 to about 50 microns, and most desirably from about 5 to about 20 microns. Further, any shape of the electrically conductive component may be used, including spherical shapes, flat shapes, amorphous shapes, and the like. Of particular use is an electrically conductive component having a substantially flake-like shape, that is, a substantially flat shape. The use of flake like shapes is useful because there may be a substantial amount of flake-to-flake contact and overlap, which may increase the electrical conductivity of the adhesive. As can be appreciated, although shapes such as spherical shapes may be used, the sphere-to-sphere contact and overlap may be lower than the contact and overlap of flake and flat shaped components. It is particularly desirable that the electrically conductive component have a surface area that is suitable to provide a desired amount of electrical conductivity. In some embodiments, the electrically conductive component has a surface area of about 15 $m^2/g$ to about 25 $m^2/g$, and more desirably from about 17 $m^2/g$ to about 23.7 $m^2/g$. As will be discussed in further detail below, however, the surface area of the electrically conductive component may be modified depending upon the amount of electrically conductive component used in the adhesive material. It is particularly useful to strike a balance between the surface area and the loading amount of the electrically conductive material.

The first part may include any desired amount of electrically conductive component. In one embodiment, the first part includes about 5% to about 25% of the electrically conductive component by weight of the first part. More desirably, the first part may include about 10% to about 20% of the electrically conductive component by weight of the first part. As may be appreciated by those of skill in the art, including too high an amount of the electrically conductive component may interfere with the adhesiveness and bond strength of the adhesive composition, while including too low an amount of the electrically conductive component may result in a composition that does not provide the desired level of conductivity.

However, it has been surprisingly discovered by the present inventors that the loading level of the electrically conductive component may be selected depending on the surface area of the component, so as to provide a suitable conductivity. If the surface area of the component is lower, the loading level of the component would need to be higher, so as to generate enough conductivity. However, again, when the loading level is too high, adhesiveness and strength may be undesirably compromised. The Applicants have determined a suitable surface area and loading level to provide suitable conductivity. For example, the electrically conductive component may be present in an amount of about 10% by weight of the first part and have a surface area of about 23.7 $m^2/g$, and provide a suitable conductivity. However, when the same electrically conductive component has a surface area of about 17 $m^2/g$ and a loading level of 10%, there may not be suitable conductivity. In a desired embodiment, if the surface area of the electrically conductive component is about 23 $m^2/g$, the loading level is about 10-15% by weight of the first part. Further, if the surface area of the electrically conductive component is about 17 $m^2/g$, the loading level is about 15-20% by weight of the first part.

For electrically conductive components having a larger surface area (i.e., about 20 to about 24 $m^2/g$), the loading level may be from about 10% to about 30% by weight of the first part. For electrically conductive components having a smaller surface area (i.e., about 17 to about 20 $m^2/g$), the loading level may be from about 15% to about 20% by weight of the first part.

The use of synthetic components, such as synthetic graphite in particular and specifically synthetic graphite in the form of a plurality of flakes, has been found to provide good electrical conductivity to the composition while still maintaining sufficient structural integrity and strength, particularly in comparison to other metal fillers. Synthetic materials are particularly useful in that they may be prepared to a high degree of purity, which is important to prevent premature curing of the first part. Further, the use of synthetic components has been found to provide a sufficient open work time and cure time for the manufacture of product components. Synthetic graphite is particularly preferred due to its low cost, high purity, and ease of use.

The first part may include an effective amount of an elastomer. If desired, the elastomer may include at least one halogen-free elastomer. The elastomer component is useful in providing added strength and stability to the cured composition. As explained above, the traditional use of halogens in bonding of personal electronic equipment may be harmful to the electronic equipment due to the corrosiveness of the halogenated compound. As such, the elastomer used in the present invention may desirably be halogen-free. The elastomer may be present in the first part in any desired amount, and particularly may be present in amounts of from about 10% to about 50% by weight of the first part. More desirably, the elastomer may be present in the first part in an amount of from about 10% to about 40% by weight of the first part.

Any elastomers, and particularly any halogen-free elastomers, may be useful in the present invention. Particularly useful are butadiene-styrene and styrene-isoprene/styrene elastomers. Other elastomers useful in the present invention include those which have a block polystyrene-isoprene-styrene copolymer and those which have a styrene-butadiene-styrene copolymer structure, such as that marketed under the trade name Kraton D-1155ES (a styrene-butadiene-styrene block copolymer having a 40% styrene content), which is commercially available from Nordmann, Rassmann GmbH. Other useful elastomers include styrene-butadiene-styrene block copolymer elastomers, such as those sold under the trade name Arkema E-21, sold by Arkema, Inc. (Philadelphia, Pa.). The elastomer or elastomers may be incorporated into the first part in the form of pellets, or they may be added in the form of a fluid. When the elastomers are added to the (meth)acrylate component, the (meth)acrylate may act as a solvent for the elastomer, incorporating the elastomer into the (meth)acrylate backbone during curing. This combination provides extra support and strength to the final cured composition.

In one particular embodiment wherein the elastomer is a styrene-butadiene-styrene block copolymer. In a preferred styrene-butadiene-styrene block copolymer, the styrene may be present in an amount of about 30-50% by weight of the copolymer, and more desirably is present in an amount of about 37-43% by weight of the copolymer. In embodiments using such block copolymers, most desirably, the styrene is present in an amount of about 40% by weight, and the butadiene is present in an amount of about 60% by weight. Elastomers having a lower styrene content may be used if desired; however, the preferred elastomer has a styrene content of about 40% by weight of the copolymer. Such lower-styrene containing styrene-butadiene-styrene copolymers include those marketed under the trade name Kraton D-1101K (31% styrene content), Kraton D-1116ES (23% styrene content), and Arkema E-21.

One embodiment of the present invention incorporates only one elastomer in the first part (preferably a halogen-free elastomer), as opposed to a combination of various elastomers in the first part. For example, the first part may include a desired amount of one styrene-butadiene-styrene block copolymer elastomer. As will be set forth in more detail in the Examples below, such formulation marks an improvement over prior curable compositions which have traditionally required a plurality of elastomers in combination to achieve a desired strength in the cured product. For example, in one previously-known composition, the composition included a mixture of acrylonitrile butadiene, vinyl terminated butadiene, and a chlorosulfonated elastomer. This combination was deemed important to achieve a desired strength in the cured product. Not only did this previous composition include an undesirable halogenated composition, but removal of any one elastomer was found to greatly reduce the impact strength of the cured product. The present invention, in contrast, is capable of providing desired strength and integrity through the use of only one elastomer. Alternatively, of course, the present invention may include a combination of elastomers if desired, but such combination is not necessary.

The first part of the inventive compositions may include any number of free radical initiators to aid in curing. In particular, such free radical initiators may include peroxides and peroxy compounds, such as, without limitation, T-butyl peroxide, T-butyl perbenzoate, cyclohexanone peroxide, and combinations thereof. Peroxides and peroxy compounds may be present in any desired amount, and are desirably present in an amount of from about 0.5% to about 5% by weight of the first part.

The first part may additionally include an acid-based catalyst, such as acrylic acid, (meth)acrylic acid, saccharin, and combinations thereof. Other acidic catalysts may also be used. In one embodiment, the first part may include acrylic acid in an amount of from about 0.1% to about 5% by weight of the first part. The first part may additionally include (meth)acrylic acid in an amount of from about 5% to about 10% by weight of the first part.

The first part may include any number of suitable fillers and filler additives. Such fillers include, but are not limited to silicas, fumed silicas, zirconium silicate, hydroxides such as those of calcium, aluminum, magnesium, iron and the like. Other fillers such as diatomaceous earth, carbonates such as sodium, potassium, calcium and magnesium may be employed. Calcium clay and synthetic fibers may also be incorporated. Additionally, the first part may include waxes and glass beads. Mixtures of fillers are contemplated. The filler and/or fillers may be present in any desired amount, and in one embodiment are present in an amount of from about 1% to about 5% by weight of the first part.

The first part may also include one or more free radical stabilizers so as to stabilize the oxygen in the peroxide component. Any desired free radical stabilizers may be used in the present invention. Suitable free radical stabilizing agents for use in inventive adhesive compositions comprising one or more cyanoacrylate monomers include hydroquinone, hydroquinone monomethyl ether, catechol, pyrogallol, benzoquinone, 2-hydroxybenzoquinone, p-methoxy phenol, t-butyl catechol, butylated hydroxyanisole, butylated hydroxytoluene, and t-butyl hydroquinone and mixtures or combinations thereof. Of particular use as free radical stabilizers are phosphonates, such as 1-Hydroxyethylidene-1, 1,-diphosphonic acid (marketed under the trade name Dequest 2010).

The free radical stabilizers may be used in the first part in any desired amount, and may be present in an amount suitable for stabilization of peroxides incorporated into the first part. The term "stabilization amount" refers to the amount of free radical stabilizer required to effectively stabilize the first part. For example, the free radical stabilizers may be present in an amount of from about 0.05% to about 2% by weight of the first part. If less peroxide is incorporated into the first part, a lesser amount of free radical stabilizers may be incorporated so as to achieve a proper stabilization amount.

The second part of the invention is desirably a separate combination of components, which is particularly designed to react with the first part to form the inventive electrically conductive curable composition. As with the first part, the second part includes a desired amount of (meth)acrylate monomers. The second part may include one (meth)acrylate monomer or it may include a combination of various (meth) acrylate monomers, as explained above. Desirably, the second part contains the (meth)acrylate monomer(s) in an amount of from about 30% to about 70% by weight of the second part. More desirably, the (meth)acrylate monomer(s) may be present in an amount of about 40% to about 70% by weight of the second part.

The second part also may contain a second halogen free elastomer. The second part may include any number of elastomers, including halogen-free elastomers such as those described above. Particularly desired are elastomers having a styrene-butadiene-styrene block copolymer, and most desired are styrene-butadiene-styrene block copolymers having a styrene content of about 37% to about 43% by weight of the copolymer. The elastomer or elastomers may be present in an amount of from about 10% to about 40% by weight of the second part. As with the first part, the elastomer(s) provides strength and stability to the final cured composition.

The second part may include one or more fillers, including those described above. Desirably, fillers may be present in the second part in an amount of from about 2% to about 6% by weight of the second part.

The second part may additionally include one or more catalysts. Suitable catalysts for the second part include amine-containing catalysts such as butylaldehyde-aniline, or metal catalysts such as copper containing solutions. If used, the amine-containing catalyst may be present in any desired amount so as to achieve curing of the final composition, and desirably may be present in an amount of from about 3% to about 10% by weight of the second part. Desirably, if used in the second part, the copper catalyst is present in an amount of from about 0.01% to about 2% by weight of the second part.

In addition to, or as an alternative to the catalysts set forth above, the second part may optionally include one or more accelerants, including amine accelerators, such as dihydrophenylpyridine or dimethyl p-toluidine (DMPT). Such accelerants may be present in an amount of from about 3% to about 10% by weight of the second part.

The second part may additionally include one or more stabilizers for stabilizing the catalysts described above. Particularly in embodiments incorporating an metal-containing catalyst (such as a copper catalyst solution), the use of a stabilizer for the catalyst may be especially useful. Any desired stabilizer may be used, including, for example, butylaldehyde/aniline. Other stabilizers may be used, including phosphines such as triphenyl phosphine, or hydrogen—donating antioxidant such as hindered phenol: butylated-hydroxytoluene or benzofuranones. The stabilizer may be present in the second part in an amount suitable to stabilize the catalyst in the second part. Desirably, the stabilizer is present in an amount of from about 3% to about 10% by weight of the second part.

The second part may include one or more fillers or additives, as explained above. Such additives and fillers may be present in an amount of from about 0.05% to about 0.90% by weight of the second part.

The two parts of the two-part composition may be separately mixed and stored until the user is ready to prepare the curable composition. For example, the first part may be mixed and stored in a first package, and the second part may be mixed and stored in a second package. The two packages may be housed together, so that the combination of the first and second parts can take place at the user's convenience. It is particularly useful that first part be maintained physically separated from the second part until curing is desired, so as to avoid unintentional mixing and thus premature curing of the final composition. The two-part curable composition may be maintained as part of a kit, the kit containing the first and second parts housed separately.

The curable composition may be prepared by combining the first part and the second part together to form a curable composition. As set forth above, the curable composition is capable of curing in about 5 minutes to about 30 minutes, at any desired temperatures. The first and second parts may be combined in any desired amounts, and are desirably combined in a weight ratio of about 2:1 (first part to second part). However, the first part may be present in an amount that is about 1.5 to about 2.5 times as high as the second part. In other embodiments, the first and second parts may be combined in approximately equal amounts.

After the first and second parts are mixed together to form a combined composition, the combined composition may be applied to a substrate as necessary to achieve the desired bonding and adhesion. The substrate may include plastic materials or metal materials, such as steel, aluminum, and the like. The substrate may include ink-coated metals. For example, the two-part composition may be applied to the top and/or bottom parts of a casing for a personal electronic device, thereby securing the casing together. In one method of bonding a casing, the first and second parts are combined to form the curable composition. The curable composition is then applied to at least one of a top part or a bottom part of a casing for a portable electronic device. The amount of composition applied to the casing may vary as desired so as to effectively secure the casing together. The top and bottom parts are then held together until the composition has cured, thereby securing the top part to the bottom part of the device. The composition desirably cures in a time that allows the user to apply the composition to the substrate and set any other pieces in position to be adhered to the substrate. If desired, the uncured composition may be subjected to heat so as to speed up the cure time.

The cured composition of the present invention displays high strength and stability, in addition to the desired electrical conductivity level. Strength and stability is particularly important in personal and portable electronic devices, which are oftentimes dropped by a user and have a high risk of components breaking or becoming separated from each other. The cured compositions of the present invention are desirably strong enough once cured to maintain their adhesiveness and integrity upon impact. In some embodiments, the electrically conductive composition has a lap shear strength of about 500 to about 2,500 psi, depending upon the particular material from which the substrate is made. For example, if a steel substrate is used, the lap shear strength is desirably from about 1,000 to about 2,000 psi. For aluminum substrates, including anodized aluminum, the lap shear strength may be from about 1,500 to about 2,200 psi. For stainless steel substrates, the lap shear strength may be from about 1,500 to about 2,200 psi. For polymeric substrates, the lap shear strength may be from about 500 to about 1,000 psi. In addition to the desired lap shear strength, the cured composition should be capable of withstanding conditions of 65° C./95% relative humidity (RH) once cured.

As may be understood, the strength of the cured composition may be related to the loading level of the electrically conductive component. If more of the electrically conductive component is present in the composition, the adhesive strength of the composition may be compromised and undesirably reduced. Thus, optimally, the amount of the electrically conductive component present in the adhesive composition will be selected to provide the desired strength level of the cured adhesive. Desirably, the electrically conductive component may be present in an amount of about 10 to about 20% by weight of the adhesive composition.

However, it is important to include the electrically conductive component in an amount that provides the desired electrical conductivity of the cured composition. Desirably, the lap shear strength and the electrical conductivity of the cured composition are balanced to provide a suitable product. Desirably, the cured composition has an electrical conductivity as measured by the resistance, where the resistance is about 8,600 to about 425,000 ohm and the calculated resistance is about 10 to about 225 ohm-cm. The measure of conductivity may be achieved through any desired means and in one embodiment, the measurement is calculated according to Military Specification MIL-A-87172 (Jun. 3, 1985), the contents of which are incorporated by reference herein.

It may be desired to measure the conductivity of the adhesive by placing a bead of the adhesive between two substantially similar sized substrates. The substrates have a known width, for example, approximately 3 inches in width. The adhesive is allowed to cure and the electrical resistance may be measured along the width of the adhered substrates. Thermal conductivity of the cured adhesive may be measured in watt/meter-K at a temperature of about 121° C.+/−5° C., in accordance with ASTM C117 or ASTM C518.

Volume resistivity may be measured as follows: a 1 inch by 3 inch glass slide is provided, and is held in place by a jig capable of holding the slide, with two scribed lines about 100 mil apart and parallel to the length. Transparent tape may then be applied at each of the two scribed lines, and a drop of the adhesive placed between the two strips of tape. The adhesive may then be spread between the tape strips, such that the length of the applied adhesive strip is at least 2.5 inches. The tapes may then be removed. If desired, a strip of copper foil or Teflon film may be placed on the adhesive strip, and a second glass slide of the same measurements placed over the foil. In this embodiment, force is applied to the assembly to compress the adhesive during cure. The adhesive is then cured. If the second glass slide and the foil/film were placed on the adhesive, the slide and foil/film are removed. The resulting glass slide with cured adhesive is then measured for volume resistance.

Resistance measurements may be made using a milliohm meter in conjunction with a four-point probe test fixture, the fixture made of an acrylic material with four spring-loaded contacts. Two of the contacts are current contacts, which are spaced about 2 inches apart and two are voltage contacts, which are spaced between the current contacts by about 0.5 inches. The measured resistance may be in ohms, and the resistivity measured by the following formula:

$$P=(R\times(W\times T))/L$$

where P is the resistivity, measured in ohm-m; R is the measured resistance (ohm); W is the width (m); T is the thickness of the applied adhesive (m); and L is the length between the inner pair of probes (m).

The present invention further provides a method of using a two-part curable composition suitable for adhesion in electronic systems. The method includes applying an electrically conductive, non-corrosive curable composition to one or more parts of an electronic device, providing secure adhesion and attachment thereto. If desired, the composition may be a halogen-free composition. In such methods of use, the first part of the curable composition as set forth above is provided to a user. Separately, the second part of the curable composition as set forth above is provided to the user. The user may then mix the first and second parts together to form a curable composition. Once the curable composition is prepared, the user may then apply a desired amount of the curable composition to one or more desired substrates. In one embodiment, the substrate may be a casing of an electronic device, including a portable electronic device, such as laptop or notebook computers, LCD screens mp3 devices, portable telephones or cellular telephones, or PDAs. The user may then allow the curable composition to cure, either at room temperature or at elevated temperatures, thereby providing a secure and non-corrosive adhesion of the desired parts of the electronic device.

A method of preparing the two-part curable composition is also provided herein. In such method, the first part, as described above, is first prepared by mixing the desired components of the first part together. This first part may then be stored in a first package or dispenser. The second part, as set forth above, is also prepared by mixing the desired components of the second part together. This second part may then be stored in a second package or dispenser. Desirably, the first and second packages or dispensers are maintained such that the first and second parts of the composition are kept physically separate from each other. The first and second packages may themselves be housed in a kit, so that the first and second compositions may be kept in proximity to each other for convenience when the user is ready to prepare the curable composition. In one embodiment, the first and second packages or dispensers may be separate cartridges, which are part of a dispensing device. Such an embodiment may also include a mixing element, such as a static mixer designed to received the appropriate amount of each part of the composition and mix them. The mixed composition may then be dispensed.

EXAMPLES

Example 1

Two-Part, Halogen-Free Curable Compositions

A two part curable composition is prepared according to the composition set forth in Table 1 below:

TABLE 1 two-part curable composition

Part A

| Component | Wt. Percentage (of Part A) |
| --- | --- |
| (meth)acrylate polymer(s) | 30-50 |
| Electrically conductive filler component(s) | 10-30 |
| halogen-free elastomer(s) | 10-40 |
| Free radical initiator(s) | 0.5-5.0 |
| Organic acid(s) | 1.0-5.0 |
| Acrylate monomer(s) | 5.0-40.0 |
| filler(s) | 1.0-5.0 |
| free radical stabilizer(s) | 0.05-2.0 |

Part B

| Component | Wt. Percentage (of Part B) |
| --- | --- |
| methacrylate monomer(s) | 30.0-70.0 |
| halogen-free elastomer(s) | 10.0-40.0 |
| Filler(s)/additive(s) | 2.0-7.0 |
| copper catalyst solution | 0.01-2.0 |
| Catalyst stabilizer(s) | 3.0-10 |

The compositions of Part A and Part B are combined together in an amount of about 2 parts Part A to about 1 part Part B to form the curable composition. The curable composition is capable of curing in about 8 hours to about 24 hours, and more desirably in about 8 hours to about 12 hours at room temperature, or alternatively in about 30 minutes to about 60 minutes at elevated temperatures of about 115° C. to about 150° C.

Example 2

Two Part Electrically Conductive Compositions

Four electrically conductive, two-part compositions (having an electrically conductive component in amounts of 5%, 10%, 15% and 20% by weight of the first part, respectively) and one control two-part composition were prepared. The five compositions have, as the first part, the following formulations:

| Component | Control % wt. | 1% wt. | 2% wt. | 3% wt. | 4% wt. |
| --- | --- | --- | --- | --- | --- |
| Methyl methacrylate | 27.85 | 26 | 25 | 24 | 23 |
| Acid curing agent[1] | 0.15 | 0.15 | 0.1 | 0.1 | 0.1 |
| Acrylate monomer | 11 | 10 | 10 | 9 | 8 |
| Dimethacrylate | 2 | 2 | 1.5 | 1.5 | 1.5 |
| Butadiene/styrene copolymer | 31 | 29 | 27 | 25.4 | 24 |
| Initiators[2] | 2 | 2 | 2.4 | 2 | 2 |
| Adhesion promoters[3] | 22 | 22 | 21 | 20 | 18.4 |
| Additives[4] | 4 | 3.85 | 3 | 3 | 3 |
| Synthetic graphite[5] | 0 | 5 | 10 | 15 | 20 |

[1]saccharin
[2]CHPO - T-butyl perbenzoate
[3]acryllic acid/methacrylic acid
[4]stabilizers, thickeners and spacers
[5]Surface Enhanced Flake Graphite, 23.7 m2/g surface area (Graphite 3775, Asbury Carbons)

The second part for each of the above compositions include:

| Component | % wt. |
| --- | --- |
| methacrylate monomer | 70.0 |
| Elastomer | 29.48 |
| Catalyst | 0.02 |
| stabilizer | 0.50 |

The two parts were combined, and applied to four substrates: steel, anodized aluminum, stainless steel, and a polyarylamide plastic substrate sold under the trade name IXEF by Solvay Advanced Polymers. The lap shear strength (measured at room temperature 24 hours after cure), the curing speed and temperature, and the resulting conductivity were measured. The results are as follows:

| | Control Composition | Composition 1 | Composition 2 | Composition 3 | Composition 4 |
| --- | --- | --- | --- | --- | --- |
| Lap Shear Strength (psi) | | | | | |
| Steel | 3,329 | 2,318 | 1,764 | 1,504 | 1,088 |
| Anodized aluminum | 3,294 | 1,937 | 2,145 | 2,091 | 1,492 |
| Stainless steel | 2,889 | 1,863 | 1,746 | — | — |
| IXEF | 1,052 | — | 1,610 | 888 | — |
| Curing temperature (° C.) | 136 | 148 | 116 | 124 | 73 |
| Curing speed (min) | 10 | 13 | 16 | 22 | 9 |
| Measured resistance (ohm) | — | 22,330,000 | 416,000 | 8,600 | 137,600 |
| Calculated resistance (ohm-cm) | 0 | 8,372 | 217 | 10.5 | 104 |

As can be seen in the above table, the control adhesive had no resistance. The composition of Sample 1 included only 5% of the electrically conductive component in the first part, and resulted in a measured resistance that was significantly too high (i.e., the conductivity was significantly too low). Compositions 2-4 provided resistances within the desired range, evidencing sufficient conductivity of the cured adhesive, and provided lap shear strengths within the desired ranges for particular substrates. The lap shear strengths for compositions 2-4 were sufficiently high for the substrate upon which they were applied.

Thus, from the above experiments, it can be concluded that inclusion of 10% to 20% of synthetic graphite, having a flake-like shape, a surface area of 23.7 m2/g, and a particle size of about 44 microns, provides sufficient adhesion while also providing sufficient conductivity. Notably, the most successful sample was Sample 3, which had the best ratio of low resistance and high adhesion, which included the synthetic graphite at a loading level of about 15% by weight of the first part. As explained above, a graphite component, such as one including a higher or lower surface area for example, may provide better results at a different loading content.

The combination of surface area and total content in the composition can be tailored to provide the desired level of conductivity without loss of structural or mechanical properties. This balance is particularly important when small amounts of the adhesive composition are required in an application. For example, in electronic devices, such as cell phones and PDA's, the adhesive must be able to withstand high impact forces, such as when the device is dropped by a user. At the same time, the adhesive should have high conductivity to ensure good reception and transmission. The present invention allows for relatively small quantities of a conductive component to achieve the necessary conductivity (or conversely, the necessary low resistance) without compromising structural properties such as strength and impact resistance. Additionally, the ability to rapidly cure at room temperature is an important property to avoid destruction of electrical components and to maximize assembly efficiency and cost savings.

What is claimed is:

1. A two-part curable composition comprising:
   a. A first part comprising:
      i. at least one (meth)acrylate monomer;
      ii. an electrically conductive component wherein said electrically conductive component comprises synthetic graphite having a surface area of about 20 m$^2$/g to about 24 m$^2$/g, present in an amount of about 10% to about 15% by weight of said first part;
      iii. an acid catalyst;
      iv. a free radical initiator; and
      v. a free radical stabilizer; and
   b. A second part comprising:
      vi. at least one (meth)acrylate monomer;
      vii. a catalyst; and
      viii. a stabilizer for stabilizing said catalyst;
   wherein said first part and said second part are combined together to form a curable composition.

2. The composition of claim 1, wherein said at least one (meth)acrylate monomer comprises at least one monomer selected from the group consisting of methyl methacrylate, butyl methacrylate, isobornyl acrylate, dibutylene dimethacrylate, tri-propanol trimethacrylate, and combinations thereof.

3. The composition of claim 1, wherein at least one of said first part or said second part includes a halogen-free elastomer.

4. The composition of claim 3, wherein said halogen-free elastomer comprises a block copolymer selected from the group consisting of a polystyrene-isoprene-styrene block copolymer, a styrene-butadiene-styrene block copolymer, and combinations thereof.

5. The composition of claim 1, wherein said acid catalyst comprises at least one organic acid.

6. The composition of claim 1, wherein said acid catalyst comprises a composition selected from the group consisting of peroxide, acrylic acid, methacrylic acid, saccharin, and combinations thereof.

7. The composition of claim 1, wherein said free radical initiator comprises at least one component selected from the group consisting of T-butyl peroxide, T-butyl perbenzoate, cyclohexanone peroxide, and combinations thereof.

8. The composition of claim 1, wherein said free radical stabilizer comprises at least one component selected from the group consisting of hydroquinones, butylated hydroxytoluene, and phosphonates.

9. The composition of claim 1, wherein said catalyst comprises at least one component selected from the group consisting of amine catalysts, metal catalysts, and combinations thereof.

10. The composition of claim 9, wherein said catalyst comprises a copper catalyst.

11. A method of preparing a two-part curable composition, comprising the steps of:
   a. Providing a first set of components comprising:
      i. at least one (meth)acrylate monomer;
      ii. an electrically conductive component wherein said electrically conductive component comprises synthetic graphite having a surface area of about 20 m$^2$/g to about 24 m$^2$/g, present in an amount of about 10% to about 15% by weight of said first part;
      iii. an acid catalyst;
      iv. a free radical initiator; and
      v. a free radical stabilizer;
   b. Mixing said first set of components to form a first part;
   c. Providing a second set of components comprising:
      i. at least one (meth)acrylate monomer;
      ii. a metal catalyst; and
      iii. a stabilizer for said metal catalyst; and
   d. Mixing said second set of components to form a second part; wherein said first part and said second part are capable of being combined together to form a curable composition.

12. A method of adhering components of an electronic device, comprising the steps of:
   a. Providing a first part comprising:
      i. at least one (meth)acrylate monomer;
      ii. an electrically conductive component wherein said electrically conductive component comprises synthetic graphite having a surface area of about 20 m$^2$/g to about 24 m$^2$/g, present in an amount of about 10% to about 15% by weight of said first part;
      iii. an acid catalyst;
      iv. a free radical initiator; and
      v. a free radical stabilizer;
   b. Providing a second part comprising:
      i. at least one (meth)acrylate monomer;
      ii. a metal catalyst; and
      iii. butylaldehyde.aniline; and
   c. Mixing said first part and said second part to form a curable composition; and
   d. Applying said curable composition to at least one surface of a component of an electrical device and allowing said curable composition to cure.

* * * * *

UNITED STATES PATENT AND TRADEMARK OFFICE
CERTIFICATE OF CORRECTION

PATENT NO. : 9,493,682 B2
APPLICATION NO. : 14/170829
DATED : November 15, 2016
INVENTOR(S) : Susan L. Levandoski, Timothy P. Walsh and Sam Bail It is certified that error appears in the above-identified patent and that said Letters Patent is hereby corrected as shown below:

In the Specification

Column 3, Line 6: Change "trimathacrylate" to -- trimethacrylate --.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*